United States Patent [19]
Stone

[11] Patent Number: 5,533,825
[45] Date of Patent: Jul. 9, 1996

[54] PARABOLICALLY HELICAL SPLINE SHAFT COUPLING

[75] Inventor: Timothy D. Stone, West Chester, Ohio

[73] Assignee: General Electric Company, Cincinnati, Ohio

[21] Appl. No.: 339,389

[22] Filed: Nov. 14, 1994

[51] Int. Cl.$^6$ .................. F16D 1/00; F16H 1/08
[52] U.S. Cl. .................. 403/359; 74/458; 74/462; 464/170
[58] Field of Search .............. 74/458, 462; 403/359; 415/124.2; 464/16, 73, 74, 170, 177, 179, 180

[56] References Cited

U.S. PATENT DOCUMENTS

| | | | |
|---|---|---|---|
| 5,647 | 6/1848 | Semple | 74/462 X |
| 1,316,998 | 9/1919 | Bijur | 74/458 X |
| 1,381,805 | 6/1921 | Crewdson | 403/359 |
| 2,002,310 | 5/1935 | Christman | 74/462 X |
| 2,095,491 | 10/1937 | Beare | 74/462 X |
| 2,098,864 | 11/1937 | Forster | 74/462 X |
| 2,201,670 | 5/1940 | Kraus | 74/458 X |
| 2,386,587 | 10/1945 | Briner | 416/165 |
| 2,565,539 | 8/1951 | Wildhaber | 74/458 X |
| 3,229,541 | 1/1966 | Wildhaber | 74/462 X |
| 3,262,331 | 7/1966 | Breuer | 74/462 X |
| 3,298,199 | 1/1967 | Grey | 464/16 |
| 3,652,037 | 3/1972 | Dolby | 244/56 |
| 3,706,509 | 12/1972 | Britt | 415/131 |
| 3,851,537 | 12/1974 | Nickstadt | 74/458 X |
| 3,865,523 | 2/1975 | Baehr | 418/201.1 |
| 3,994,128 | 11/1976 | Griswold, Jr. et al. | 60/226.1 |
| 3,997,042 | 12/1976 | Langham | 192/46 |
| 4,187,735 | 2/1980 | Terry | 74/410 |
| 4,292,001 | 9/1981 | Snell | 403/359 |
| 4,395,247 | 7/1983 | Roberts | 464/158 |
| 4,541,296 | 9/1985 | Oyafuso | 74/462 X |
| 4,552,030 | 11/1985 | Szecsei | 74/462 |
| 4,572,291 | 2/1986 | Robison | 166/173 |
| 4,615,422 | 10/1986 | Thebert | 192/53 B |

FOREIGN PATENT DOCUMENTS

| | | | |
|---|---|---|---|
| 602726 | 4/1978 | U.S.S.R. | 74/462 |
| 3084 | of 1866 | United Kingdom | 74/462 |
| 15516 | of 1899 | United Kingdom | 74/458 |

Primary Examiner—Blair Johnson
Assistant Examiner—Andrea Chop
Attorney, Agent, or Firm—Andrew C. Hess; Patrick R. Scanlon

[57] ABSTRACT

A coupling for splining together first and second shafts which may be inner and outer, co-axial annular members, abutting co-axial annular members, or intermeshing gears on parallel shafts. One embodiment is a coupling for splining together inner and outer annular members having corresponding inner and outer cylindrical surfaces concentrically disposed about an axis and having splines which are generally circumferentially disposed on the cylindrical surfaces along an axial length of at least one of the members such that the splines having a varying pitch so as to be curved with respect to the axis. The pitch is defined by a function which varies parabolically with respect to a shaft axis and, in a more particular embodiment, the function has a non-zero fixed pitch component and a parabolic component so that the shape of the splines are both helical and parabolic.

10 Claims, 5 Drawing Sheets

PARABOLICALLY HELICAL SPLINE SHAFT COUPLING

BACKGROUND OF THE INVENTION

1. Field of the Invention

This invention relates to shaft couplings and, in particular, to splined shaft couplings.

2. Description of Related Art

It is known to provide a splined coupling between a hub and a shaft, comprising axial splines having flanks which transmit torque between the hub and the shaft and, further comprising a shoulder on the shaft at one end of the hub and a nut on the shaft at the other end of the hub whereby to clamp the hub axially against the shoulder. In such a coupling, it is not always possible to establish firm contact between the torque-transmitting flanks of the splines. As the amount of torque transmitted through splines has increased over the years, it has become apparent that the twist caused by the torque causes the ends of the splines to come into contact first. This greatly increases the stress at the ends of the splines, reducing their useful life. Additionally, it reduces the usefulness of the center of the splines, limiting the amount of torque that can be carried by that spline.

One solution to this problem has been to machine away some of the material that is caused to interfere by shaft twist. A guide to how much material to remove may be found by subtracting the tangential displacements of the male spline, typically ridges, for even loading from those of the female spline, typically mating grooves for the ridges. One way to remove the material causing the interference due to shaft twist is to introduce helical correction by machining the splines at a very small angle from true axial. Therefore, a shaft coupling having helical splines have been developed, such as that disclosed in U.S. Pat. No. 4,292,001, wherein a shaft coupling provides two relatively inner and outer members having a common axis, a means defining first surfaces provided on the respective members in circumferentially confronting relationship, a means defining second surfaces provided on the respective members in circumferentially confronting relationship and, the first and second surfaces extending at different helix angles relative the axis. As used in aircraft engine shaft coupling, this patent also provides a well known and conventional urging means for urging the members relatively axially such that the first and second surfaces co-operating to lock the members against relative axial movement and to impart to the members opposing circumferential forces urging the members into engagement at the first and second surfaces, respectively.

SUMMARY OF THE INVENTION

The present invention provides a coupling for splining together first and second annular members which may be inner and outer co-axial annular members, abutting co-axial annular members, or intermeshing gears on parallel shafts. One embodiment has shafts with corresponding inner and outer cylindrical surfaces concentrically disposed an axis and a plurality of curved splines generally circumferentially disposed on one of the cylindrical surfaces along an axial length of one of the members, such that the curved splines have a varying pitch so as to be curved with respect to the axis. A more particular embodiment of the coupling provides the curved splines with pitch that varies parabolically with respect to said axis while yet another embodiment provides a pitch that is defined by a function having a non-zero fixed pitch component and a parabolic component so as to be both helical and parabolic.

ADVANTAGES

Among the advantages provided by the present invention is the ability to establish firmer contact between the torque-transmitting flanks of interdigitated splines. The present invention reduces the amount of interference at the ends of the teeth caused by the relative shaft twist. Thus, the present invention increases the amount of torque that can be transmitted through a given sized spline coupling. The present invention increases the useful life of the spline coupling because it greatly decreases the stress at the ends of the splines thus increasing their useful life. Another advantage is that the present invention increases the usefulness of the center of each spline thus increasing the total amount of torque that can be carried by each spline.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
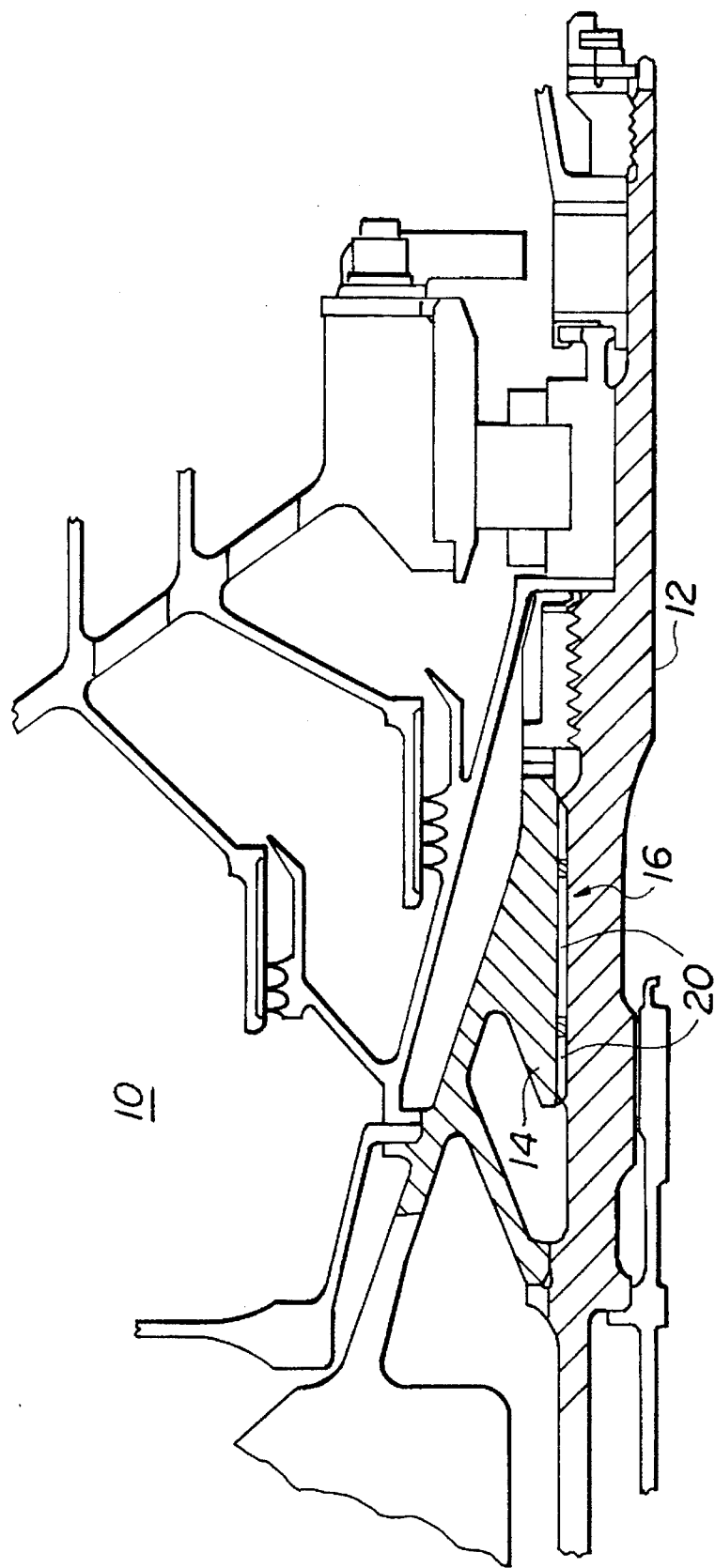
FIG. 1 is a diagrammatic side elevational view of a portion of a gas turbine engine embodying a shaft coupling in accordance with an exemplary embodiment of the present invention.

Illustrated in FIG. 1 is a schematic representation of a portion of an aircraft turbofan gas turbine engine 10 illustrating an output turbine shaft 12 drivingly connected to a fan shaft 14 through a splined coupling 16 in accordance with an exemplary embodiment of the present invention.

Figure 2:
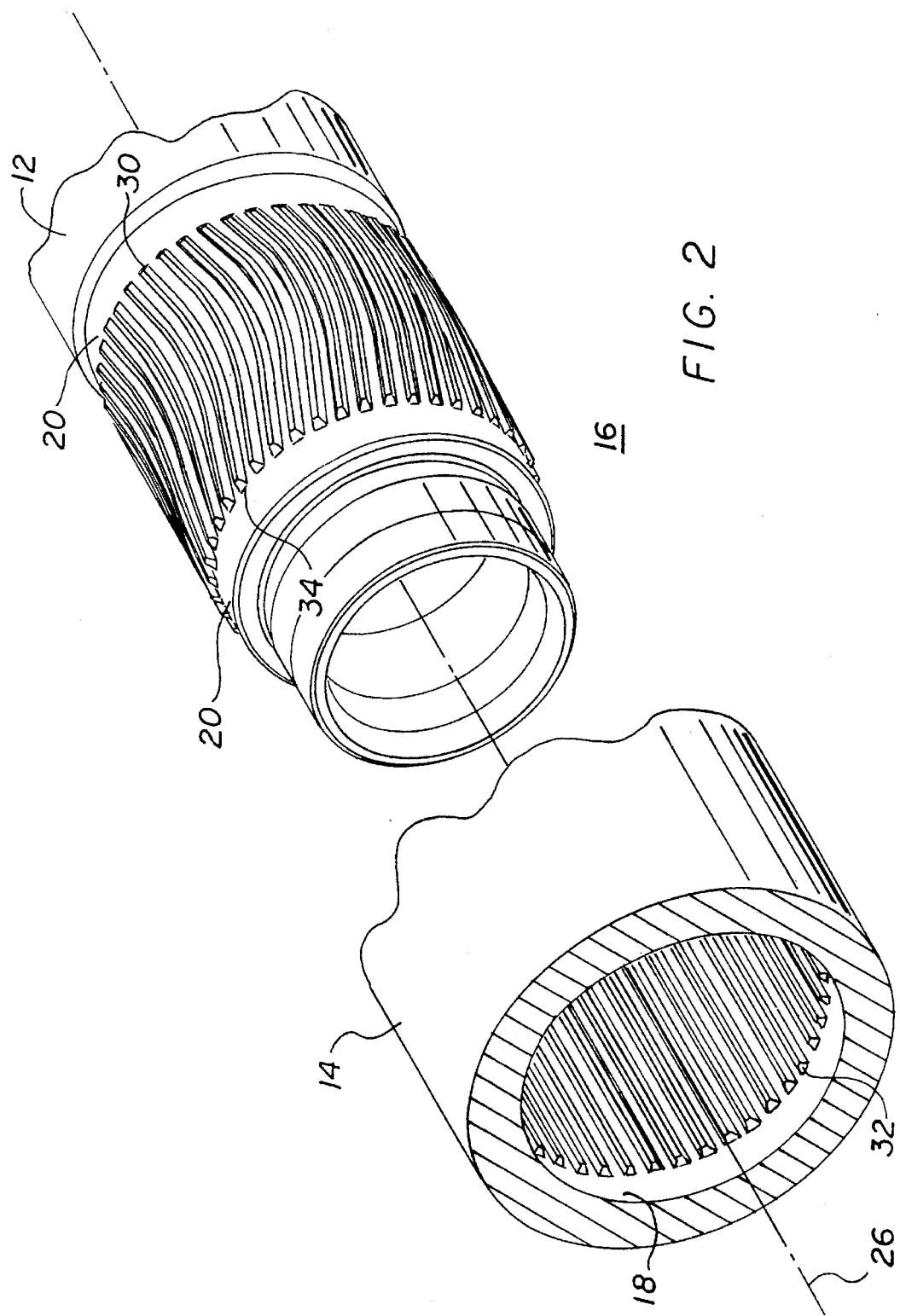
FIG. 2 is an exploded perspective view of the shaft coupling illustrated in FIG. 1.

Referring now also to FIG. 2, the coupling 16 connects together an inner annular member, the turbine shaft 12, to an outer annular member, the fan shaft 14. The turbine shaft 12 has an outer cylindrical surface 20 and the fan shaft 14 has an inner cylindrical surface 18 which are concentrically disposed about the engine axis 26. A plurality of external parabolically helical curved external splines 30 are generally circumferentially disposed on the outer cylindrical surface 20 and corresponding internal straight or linear internal splines 32 are generally circumferentially disposed on the inner cylindrical surface 18. The curved external splines 30 are teeth extending outward from the outer cylindrical surface 20 of the turbine shaft 12 and the internal splines 32 are grooves extending inward from the inner cylindrical surface 18 of the inner cylindrical surface 18. Parabolically helical curved external splines 30 are so described because of their shape with respect to the axis 26. This is often referred to as the pitch. The distance between the straight internal splines 32 is sufficient to accommodate the mating curved external splines 30.

Figure 3:
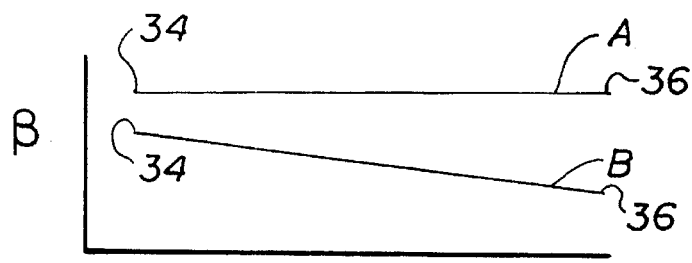
FIG. 3 is curve illustrating prior art spline shapes as a function of their axial location.
Figure 4:
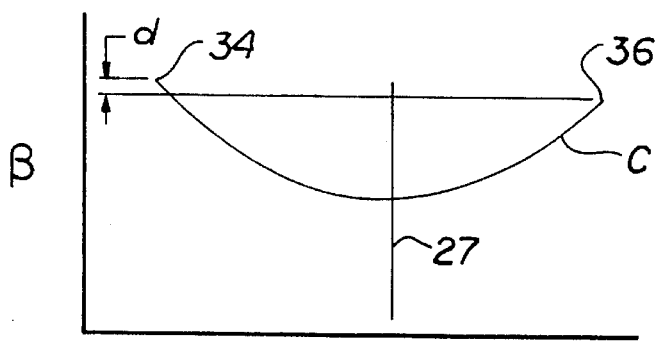
FIG. 4 is curve illustrating a spline shape in accordance with an exemplary embodiment of the present invention as a function of its axial location.
Figure 5:
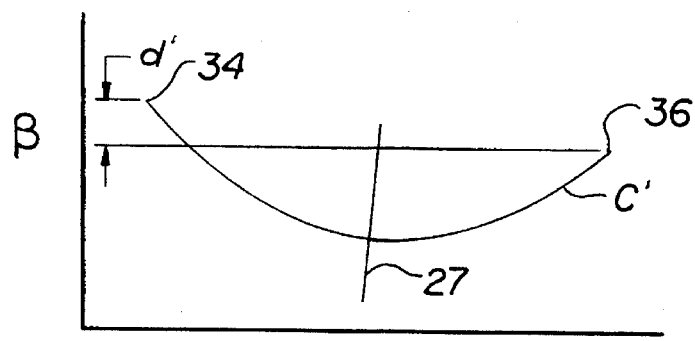
FIG. 5 is curve illustrating an alternative spline shape in accordance with another exemplary embodiment of the present invention as a function of its axial location.

The shape or pitch is more easily discussed by looking at an exaggerated shape of the curved splines layed out flat as illustrated in FIGS. 3, 4 and 5 instead of rolled around the cylindrical surfaces. Illustrated in FIG. 3 are two functions defining prior art shapes of splines. Functions A is a straight or linear spline and B is a helical spline. Function C Illustrated in FIG. 4 represents the shape of a spline in accordance with the present invention, the parabolically helical splines 30 in FIGS. 1 and 2. These three functions are illustrated as defining the location of a spline around the annular member by an angular coordinate β as a function of a linear coordinate X along the axis 26. Since the splines are on a cylindrical surface β may be thought of as in mils with respect to the axis. Whereas functions A and B represent splines that have a fixed pitch, the function A having 0 pitch and the function B having a non-zero constant pitch, function C represents splines of the present invention which have a varying pitch so as to be curved with respect to the axis 26. The preferred embodiment includes curved splines that are curved parabolically and that have a forward end 34 that is at a different angular coordinate β than an aft end 36. This may be viewed as the spline-having a symmetrical parabolic component and a helical component to its shape which can be defined by a function having a non-zero fixed pitch component and a parabolic component.

Function C has its forward end 34 higher up on a parabola than its aft end 36 so that they are spaced apart an amount d along β. The parabolic function C is defined about a centerline 27 which bisects the function C and is normal to the X coordinate line, which in turn represents a line parallel to the axis 26 in the exemplary embodiments of FIG. 2. Alternatively the forward end 34 and the aft end 36 may be spaced evenly, or otherwise, up on a parabolic function C' that is defined about a centerline 27 which bisects the function C' and is not normal to the X coordinate line as illustrated in FIG. 5 so that they are also spaced apart an amount d' along β.

Figure 6:
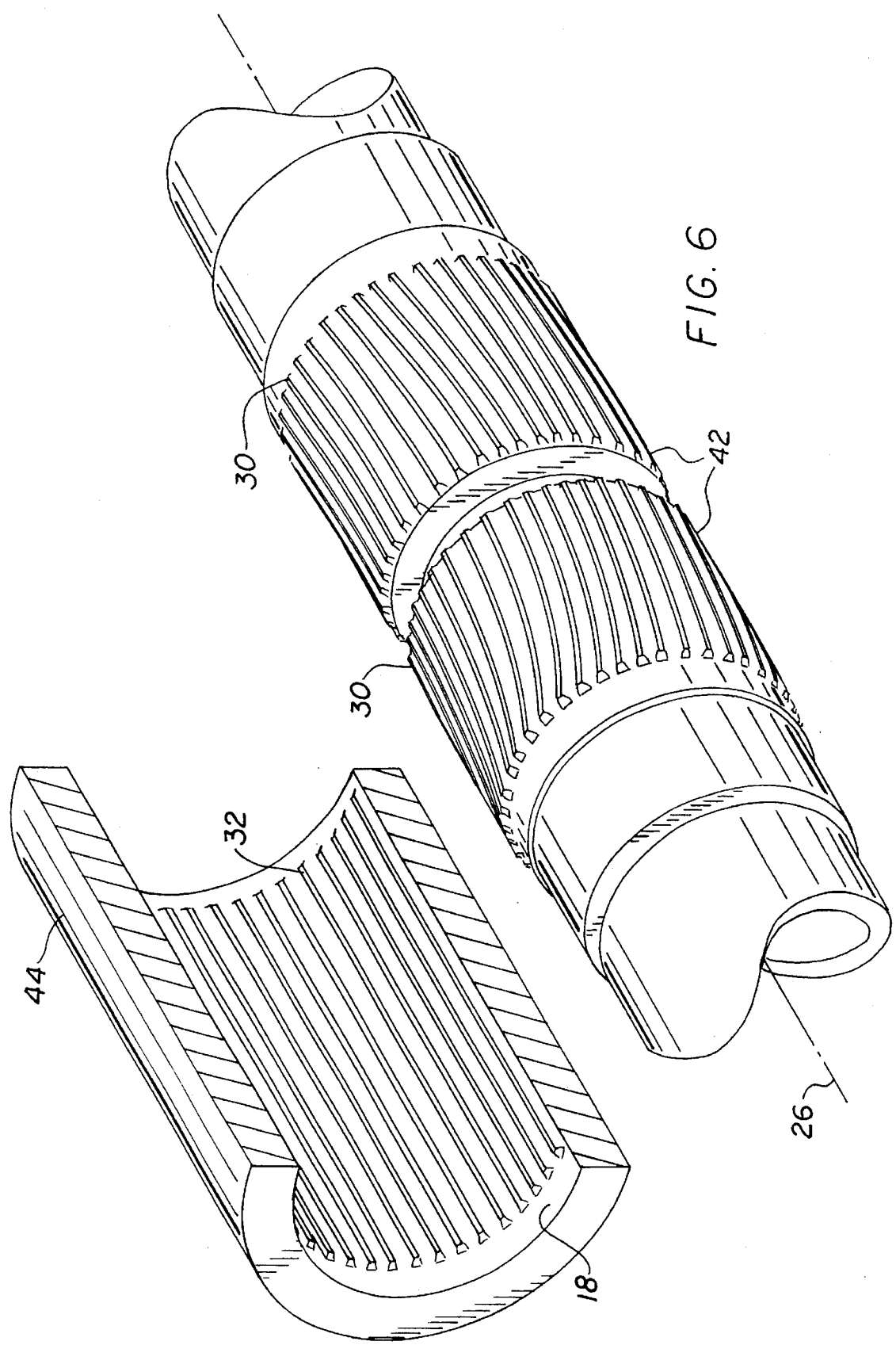
FIG. 6 is an exploded perspective view of an alternative shaft coupling.
Figure 7:
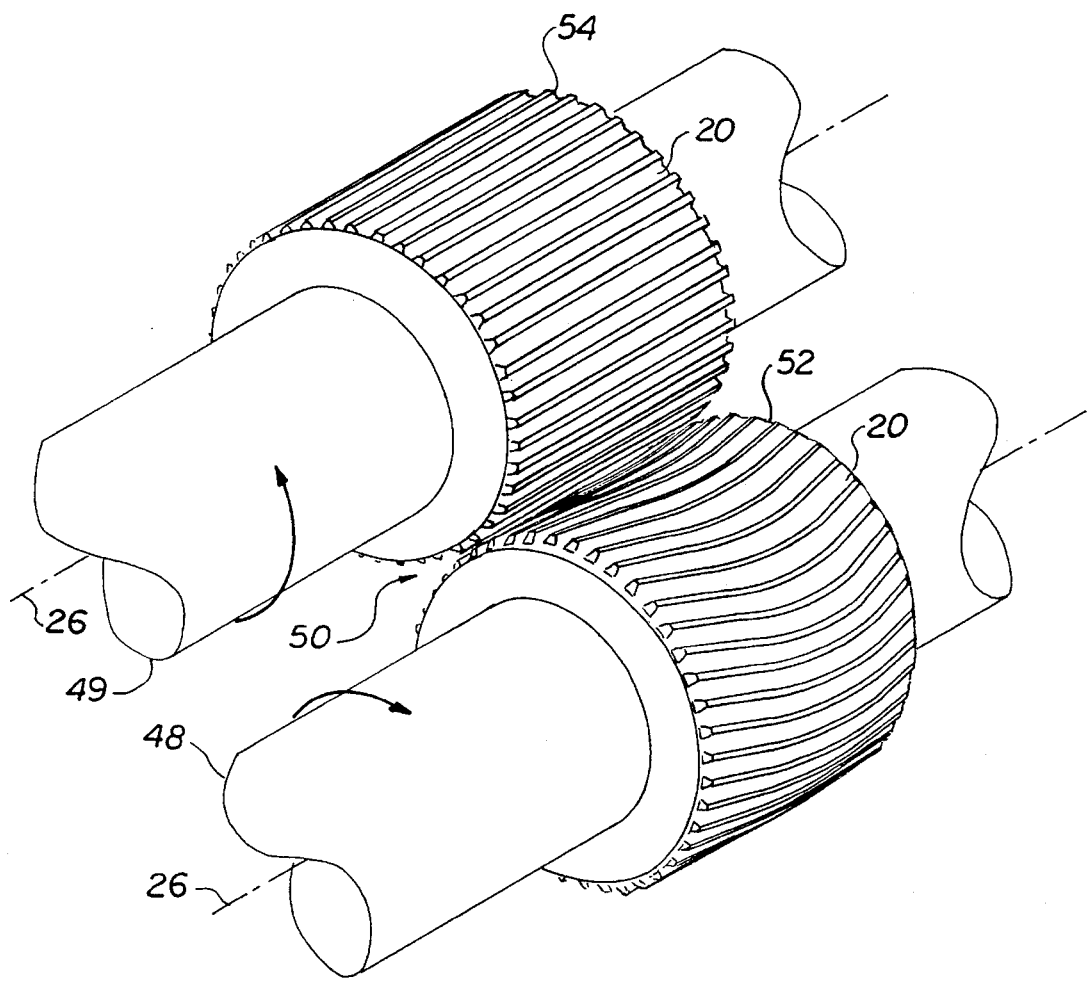
FIG. 7 is a perspective view of a gear assembly having teeth in accordance with an embodiment of the present invention.

The present invention has been illustrated as a coupling between inner and outer shafts wherein one has a plurality of splines in the form of teeth and the other has splines in the form of grooves which mate with these corresponding teeth wherein either of plurality has curved splines in accordance with the present invention and the other plurality has straight or linear splines. Though not shown alternative embodiments may include curved splines on both shafts or cylindrical surfaces. The present invention contemplates other embodiments for coupling shafts with splines and applying parabolically helical curved function to gear teeth which resemble splines (splines are often referred to as teeth and described with the same terminology. Illustrated in FIG. 6 is one of these other embodiments, an outer annular member 44 concentrically disposed around and splines together two generally adjacent or abutting coaxial inner annular members 42. The coupling of the present invention may also be used to spline a hub to a shaft. Gears are also a means of coupling shafts for the purpose of transmitting power between the shafts. Illustrated in FIG. 7 is an embodiment of the present invention which provide first and second shafts 48 and 49 respectively with intermeshing gears 50 having curved teeth 52 extending outward from the outer cylindrical surface 20 on the first shaft 48 and straight or linear teeth 54 extending outward from the outer cylindrical surface 20 of the second shaft 49. The curved teeth 52 are parabolically shaped in a curve with respect to their individual axis 26 in accordance with the present invention as discussed above for the splines.

While the preferred embodiment of the present invention has been described fully in order to explain its principles, it is understood that various modifications or alterations may be made to the preferred embodiment without departing from the scope of the invention as set forth in the appended claims.

I claim:

1. A coupling comprising:

splined together first and second parallel shafts, first and second cylindrical surfaces located on the first and second parallel shafts respectively, each of said shafts having a shaft axis, a plurality of curved splines generally circumferentially disposed on one of said cylindrical surfaces, said curved splines having a varying pitch so as to be curved with respect to the respective shaft axis, and a plurality of straight splines generally circumferentially disposed on the other of said cylindrical surfaces, the splines of the respective cylindrical surfaces engage each other.

2. A coupling as claimed in claim 1 wherein said first and second shafts are inner and outer annular members respectively that are at least partially co-extensively disposed about a common axis, said first cylindrical surface is an outer cylindrical surface and second cylindrical surface is an inner cylindrical surface, and said plurality of curved splines are disposed along an axial length of the respective one of the members.

3. A coupling as claimed in claim 2 wherein said pitch varies parabolically with respect to said common axis.

4. A coupling as claimed in claim 3 wherein said pitch is defined by a function having a non-zero fixed pitch component and a parabolic component.

5. A coupling as claimed in claim 3 wherein each of said curved splines has a forward end and an aft end wherein said ends have different angular coordinates around said respective cylindrical surface.

6. A coupling as claimed in claim 1 wherein the coupling comprises intermeshed gears, said first and second shafts are spaced apart, and said splines are gear teeth.

7. A gas turbine engine shaft coupling comprising:

annular inner and outer shafts having a common shaft axis, an inner cylindrical surface disposed on said outer shaft and an outer cylindrical surface disposed on said inner shaft wherein said cylindrical surfaces are generally co-extensive, a plurality of curved splines generally circumferentially disposed on one of said cylindrical surfaces, said curved splines having a varying pitch so as to be curved with respect to said axis, and a plurality of straight splines generally circumferentially disposed on the other of said cylindrical surfaces.

8. A coupling as claimed in claim 7 wherein said pitch varies parabolically with respect to said common axis.

9. A coupling as claimed in claim 8 wherein said pitch is defined by a function having a non-zero fixed pitch component and a parabolic component.

10. A coupling as claimed in claim 9 wherein each of said curved splines has a forward end and an aft end wherein said ends of have different angular coordinates around said respective cylindrical surface.

* * * * *